United States Patent
Shahar (10) Patent No.: US 8,098,604 B2
(45) Date of Patent: Jan. 17, 2012

(54) WIMAX BASED POINT TO MULTIPOINT SYSTEM OPERATING IN FREQUENCIES BELOW 1 GHZ

(75) Inventor: Menashe Shahar, Los Altos, CA (US)

(73) Assignee: Full Spectrum Inc., Menlo Park, CA (US)

( * ) Notice: Subject to any disclaimer, the term of this patent is extended or adjusted under 35 U.S.C. 154(b) by 169 days.

(21) Appl. No.: 12/426,697

(22) Filed: Apr. 20, 2009

(65) Prior Publication Data

US 2010/0265851 A1    Oct. 21, 2010

Related U.S. Application Data

(60) Provisional application No. 61/046,431, filed on Apr. 20, 2008.

(51) Int. Cl.
  *H04B 7/00* (2006.01)
  *H04B 7/204* (2006.01)
  *H04H 20/71* (2008.01)

(52) U.S. Cl. .......... 370/310; 370/312; 370/319; 455/45; 455/524

(58) Field of Classification Search .................. 370/378
See application file for complete search history.

(56) References Cited

U.S. PATENT DOCUMENTS

| | | | |
|---|---|---|---|
| 7,778,211 B2* | 8/2010 | Hedayat et al. | 370/310 |
| 7,957,478 B2* | 6/2011 | Chalmers et al. | 375/260 |
| 2006/0039272 A1* | 2/2006 | Sikri et al. | 370/208 |
| 2008/0112474 A1* | 5/2008 | Refaeli | 375/222 |
| 2009/0279517 A1* | 11/2009 | Chin et al. | 370/338 |
| 2009/0325566 A1* | 12/2009 | Bell et al. | 455/419 |
| 2010/0172279 A1* | 7/2010 | Chen et al. | 370/312 |

* cited by examiner

*Primary Examiner* — Huy Vu
*Assistant Examiner* — Brandon Renner
(74) *Attorney, Agent, or Firm* — Daniel J. Swirsky; AlphaPatent Associates, Ltd.

(57) ABSTRACT

A system for the delivery of high speed data mission critical, private broadband wireless networks based on a modified version of the ieee802.16e-2005 standard and subsequent versions of this standard referred to, known as "mobile WiMAX". The system comprises a plurality of base stations, each of said base stations covering at least one sector, which maintain two-way data communication, with a plurality of mobile stations and fixed subscriber stations in its serving area, over licensed frequency bands below 1 GHz in accordance with the mobile WiMAX standard. The mobile WiMAX air interface standard (ieee802.16e) is modified for channel sizes below 1.25 MHz.

16 Claims, 11 Drawing Sheets

| PHY LAYER 40 | MAC LAYER 42 | COMPLEMENTARY EMBEDDED SW |
|---|---|---|
| BS PHY LAYER INNOVATIVE CAPABILITIES | BS MAC LAYER INNOVATIVE CAPABILITIES | NETWORKING, SNMP AGENT ETC. |
| Ieee802.16-e COMPLIANT BS PHY LAYER SOFTWARE | Ieee802.16-e COMPLIANT BS MAC LAYER SOFTWARE | |
| BASIC SOFTWARE INFRASTRUCTURE | OPERATING SYSTEM ||
| EMBEDDED SIGNAL PROCESSOR | EMBEDDED GENERAL PURPOSE PROCESSOR ||

WIMAX BASED POINT TO MULTIPOINT SYSTEM OPERATING IN FREQUENCIES BELOW 1 GHZ

CROSS-REFERENCE TO RELATED APPLICATIONS

This application claims priority from U.S. Provisional Patent Application No. 61/046,431, filed Apr. 20, 2008, which is incorporated herein by reference in its entirety.

FIELD OF THE INVENTION

The present invention relates to the delivery of high speed data services in mission critical, private broadband wireless networks based on a modified version of the ieee802.16e-2005 standard and subsequent versions of this standard referred to as "mobile WiMAX".

BACKGROUND OF THE INVENTION

Mission critical industries, such as electrical utilities, oil and gas industries, for example, have assets deployed in remote areas often not well covered by public wire line and wireless telecommunication networks. Moreover, even when public telecommunication services are available, mission critical industries are reluctant to use these services and prefer to operate their own private wireless networks. These networks typically have got their own towers with a serving area that extends up to 20 miles radius.

Traditionally, mission critical industries have built and operated voice centric Private Land Mobile Radio (PLMR) systems making it difficult to support emerging mission critical mobile and fixed data applications, such as remote data base access, for example. These systems have several drawbacks, as follows:

Communication in PLMR systems is via narrowband PLMR channels. A PLMR channel width of 25 KHz is typically used, but the FCC regulations have mandated the narrow banding of certain frequencies, reducing channel sizes from 25 KHz to 12.5 KHz in order to double the number of available PLMR channels. The FCC is considering a further decrease in PLMR channel width to 6.25 KHz. As a result, while PLMR channels can support excellent voice quality, data communication is very slow.

Most PLMR systems are circuit switched systems. As such, they are not efficient for data communication. Research with real customer data reveals that channel voice occupancy is typically very low.

Several solutions are currently used by mission critical industries to deliver data services, as follows:

Public wireless networks: These networks typically lack coverage across the PLMR user's serving area. Also, with their commitment to serve the general public, these systems are not considered mission critical by the PLMR users.

Dedicated data networks operating in unlicensed bands (900 Mhz, 2.4 Ghz or 5.8 Ghz). Because of transmit power restrictions in the unlicensed bands (as per FCC part 15 regulations), the higher frequency (relative to the PLMR operating frequencies) and the interference generated by other users of these bands, the coverage of these systems is relatively poor. Coverage can be improved with a costly dense node deployment. In addition, these systems are not considered robust enough for mission critical applications and are limited in their support of mobility.

Dedicated data networks operating in licensed bands (e.g. 700 MHz): This solution does supports mission critical high speed data but is very costly given that:

It is highly desirable to have an operational licensed frequency below 1 GHz which will enable the delivery of mobile broadband data services over the existing PLMR tower serving area of up to 20 miles, to avoid the need to build new towers. The cost of licensing the frequencies is very high, especially if the customer is locked to a single frequency holder.

Only few licensed frequency opportunities are available countywide while many different licensed frequency opportunities are available in limited geographies. This implies that if the equipment is designed to operate in a specific frequency, it may not have the economy of scale that is needed to bring the cost down to an acceptable level.

There is thus a need to provide an innovative wireless system and a method to implement a mission critical high speed data solution with similar coverage to the existing PLMR voice service, which overcome the disadvantages of present systems.

SUMMARY OF THE INVENTION

The present invention provides bidirectional Point-to-Multipoint (PtMP) data communication between a dispatch center and many fixed or mobile Remote Terminals (RTs). The system consists of one optional Base Station Controller (BSC) located at the Network Operation Center (NOC), multiple Base Stations (BSs) located at the PLMR tower sites, Mobile Stations (MSs) and fixed Subscriber Stations (SSs).

In an embodiment of the present invention, the system may deliver broadband data to a mobile users over an exceptional long range of up to 20 miles to match the serving area of existing towers, and thus avoid the need to construct new towers. Long range communication is accomplished by any of the following:

i. Operation in frequencies below 1 GHz which have good propagation characteristics
ii. Advanced antenna techniques
iii. High TX power from both BS and MS/SS.
iv. Advanced signal processing techniques In an embodiment of the present invention, the system may support a wide range of frequency opportunities, which allows the customer negotiating power with frequency holders and thus, avoids being locked into a single frequency holder. This is facilitated by operating over a wide range of frequencies below 1 GHz and operating in a wide range of channel width as described hereinbelow to be able to leverage as many frequency opportunities as possible including the customer's owned frequencies.

In one embodiment of the invention, the system employs the existing PLMR tower and backhaul infrastructure to maintain coverage across the serving area (same as voice). In another embodiment of the invention, the system employs its own towers and/or backhaul infrastructure.

In one embodiment of the invention, the system employs Time Division Duplex (TDD), that is, downlink transmission from BS to MSs/SSs and uplink traffic from MSs/SSs to BS is carried out over the same channel frequency but at different periods of time. In another embodiment of the invention, different channel frequencies are used to transmit and receive by the BS and MSs/SSs at different time periods. In yet another embodiment of the invention, the system may employ Frequency Division Duplex (FDD), that is, downlink transmission from BS to MSs/SSs and uplink traffic from MSs/SSs to BS may be carried out over different frequencies at the same time. The description below relates to the use of TDD duplexing.

In an embodiment of the invention, the system employs a modified version of "mobile WiMAX" for the air interface protocol. The system employs the standard mobile WiMAX air interface protocol when the channel is supported by the standard (e.g., 1.25 MHz, 1.75 MHz, 3.5 MHz, 5 MHz and 10 MHz wide channels) and a modified version of the air interface protocol when the channel size is not supported by the standard as described hereinbelow.

There is thus provided, in accordance with an embodiment of the present invention, a point to multipoint wireless system which includes a router hub, a plurality of base stations, each of the base stations covering at least one sector, and a plurality of mobile stations and fixed subscriber stations. Each of the base stations maintains two-way data communication, with the plurality of mobile stations and fixed subscriber stations in its serving area, over licensed frequency bands below 1 GHz in accordance with the mobile WiMAX air interface standard (ieee802.16e). The mobile WiMAX air interface standard (ieee802.16e) is modified for channel sizes below 1.25 MHz.

Furthermore, in accordance with an embodiment of the invention, the system further includes a base station controller in communication with the router hub.

Furthermore, in accordance with an embodiment of the invention, the frequency bands have a range of frequencies from 40 MHz to 1 GHz.

Furthermore, in accordance with an embodiment of the invention, the two-way data communication utilizes Time Division Duplexing (TDD) operation.

Furthermore, in accordance with an embodiment of the invention, each of the plurality of base stations and each of the plurality of mobile stations includes a baseband processor module in communication with an analog front end module. The baseband processor module includes a general purpose processor, a general purpose DSP (Digital signal processor) and a general purpose FPGA (field-programmable gate array). The baseband processor module may also include a GPS module.

Furthermore, in accordance with an embodiment of the invention, the baseband processor module includes a bank of digital filters implemented in the FPGA, each filter of the bank of digital filters configured to support a specific channel size and a specific downlink and uplink permutations and specific FCC spectral mask, in accordance with the mobile WiMAX standard.

Furthermore, in accordance with an embodiment of the invention, the analog front end is configured to perform the steps of:
reception of digital I and Q from the Baseband Processor Digital to Analog conversion;
frequency up-conversion from baseband to a pre-determined IF frequency and then down-conversion to the RF frequency;
amplification to the TX power level using a configurable attenuator, wherein the TX power level is configured manually by the operator at the base station and configured automatically at the mobile station using the mobile WiMAX ranging process;
filtering to suppress out of channel and out of band interference;
Digital Pre-Distortion (DPD) equalization to attenuate inter-modulation products generated as a result of Power Amplifier non-linearity thereby to reduce transmit power backoff requirements; and
feeding at least one signal to at least one antenna) through a T/R switch to support TDD operation, wherein during the transmit phase of the TDD frame, the T/R switch is in the Transmit state and the transmit signal is returned to the receive path through a coupler, and wherein the transmit signal is returned over the receive path as a feedback signal for the DPD.

Furthermore, in accordance with an embodiment of the invention, the analog front end is configured, while receiving, to perform the steps of:
RF filtering to protect the LNAs;
Reception of the RF signal from the antenna through the T/R switch, when in the receive state;
Low Noise Amplification;
frequency up-conversion from the RF frequency to a pre-determined IF frequency, IF filtering using a SAW filter bank, Automatic Gain Control (AGC) amplification and down-conversion and demodulation into analog I and Q signals;
analog filtering of analog I and Q by means of a programmable analog filter; and
analog to digital conversion of I and Q and delivery to the baseband processor module.

Furthermore, in accordance with an embodiment of the invention, the available bandwidth is reused in each sector in a tower site.

Furthermore, in accordance with an embodiment of the invention, each sector in a tower site operates over distinct sub-channels, wherein any two sectors in the tower site do not employ the same sub-channels.

Furthermore, in accordance with an embodiment of the invention, the analog front end module base stations and each of the plurality of mobile stations is configured to deliver all sub-channels within the channel to the baseband processor module, wherein the baseband processor module only processes the sub-channels that are utilized in the respective sector Furthermore, in accordance with an embodiment of the invention, each of the plurality of base stations utilizes a Fractional Frequency Reuse (FFR) scheme. The FFR includes a DL (Downlink) MAP message having two PUSC zones and an UL (Uplink) MAP message having two PUSC zones. The first PUSC zone in the DL MAP message and in the UL MAP message are allocated all the sub-channels and the second PUSC zone in the DL MAP and in the UL MAP are allocated distinct sub-channels, which have not been allocated in the second zone in other sectors at the same tower site. Each mobile station is allocated transmit opportunities in the first or second zone, depending on its instantaneous Carrier to Interference and Noise Ratio (CINR).

Furthermore, in accordance with an embodiment of the invention, the baseband processor module further includes a RS232 interface configured to interface to legacy Supervision Control and Data Acquisition (SCADA) devices, wherein a non-standard Service Specific Convergence Sub-layer is configured to encapsulate the legacy SCADA protocol over the mobile WiMAX air interface protocol.

Furthermore, in accordance with an embodiment of the invention, the PHY (physical) Layer of each of the plurality of base stations and each of the plurality of mobile and subscriber stations is configured to support channel sizes having a bandwidth less than 1.25 MHz by scaling down the sub-carrier frequency spacing in a linear proportion to the standard mobile WiMAX 128 FFT configuration designed for a 1.25 MHz wide channel.

Furthermore, in accordance with an embodiment of the invention, the sub-carrier frequency spacing (Δf) is reduced in accordance with the formula: Δf=(BW/1.25 MHz)*10.94 KHz, The Useful Symbol time (Tb) will be increased in accordance with the formula: Tb=1/Δf=1/((BW/1.25 MHz) *10.94 KHz), the Cyclic Prefix (Tg) will be increased in accordance with the formula: Tg=Tb/8 and the Total OFDMA Symbol Time (Ts) will be increased to Ts=Tg+Tb.

Furthermore, in accordance with an embodiment of the invention, the number of sub-carriers is reduced in accordance with the formula: N=floor (BW/10.94 KHz).

Furthermore, in accordance with an embodiment of the invention, each TDD frame includes a minimum of 47 OFDMA symbols.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

The present invention relates to a mobile WiMAX (Worldwide Interoperability for Microwave Access) based system, operating in frequencies below 1 GHz.

Figure 1:
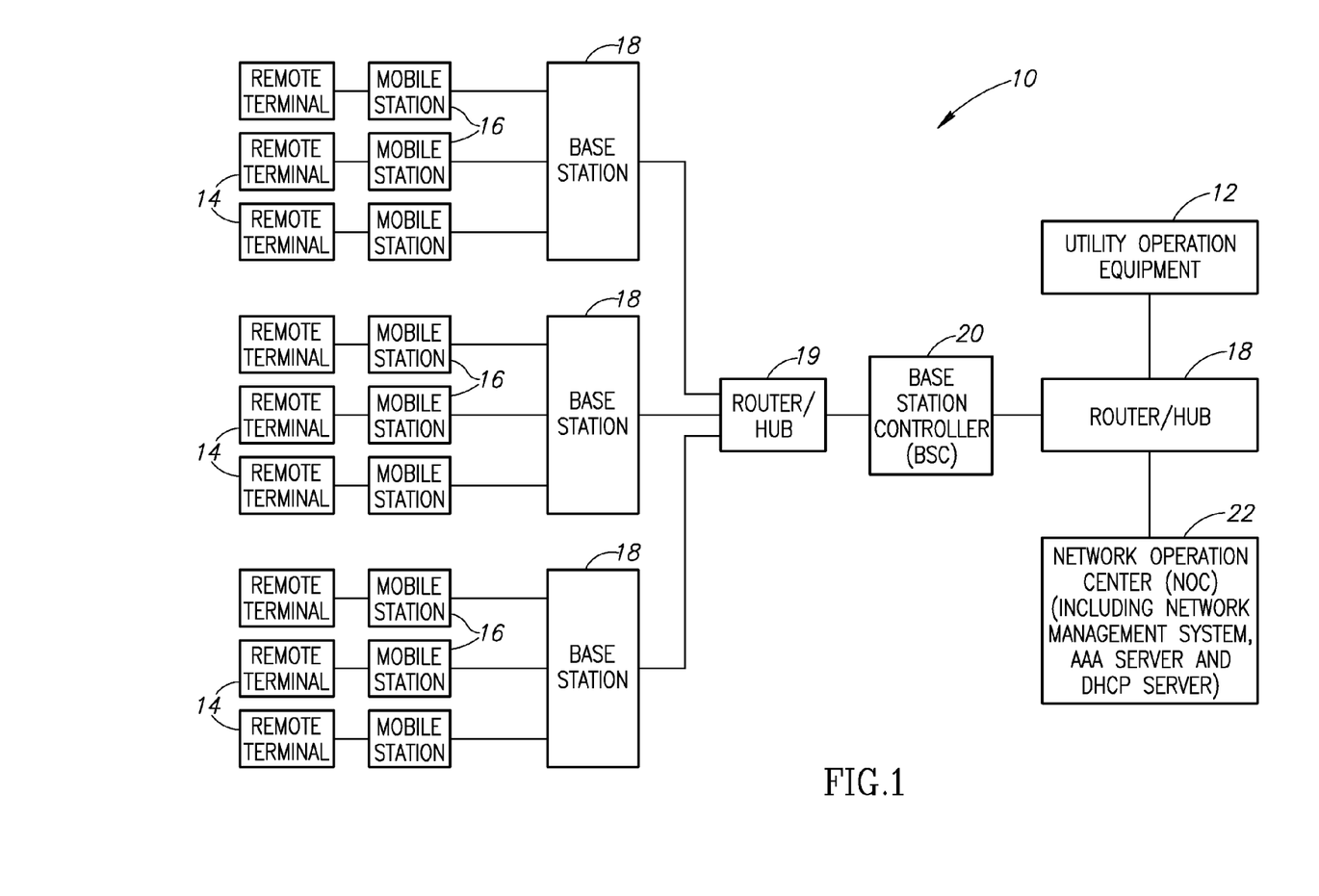
FIG. 1 is a schematic illustration of an IEEE802.16-e based, PtMP wireless system operating over licensed bands below 1 GHz, according to an embodiment of the present invention.

Reference is now made to FIG. 1, which is a schematic illustration of an IEEE802.16-e based, PtMP wireless system, generally designated 10, operating over licensed bands below 1 GHz, according to an embodiment of the present invention.

The system communicates between Utility Operation Equipment 12 and a plurality of Remote Terminals (RTs) 14, which may be connected to Mobile Stations (MS)/fixed Subscriber Stations (SS) 16. The system implements the transmission method of the present invention described hereinbelow, for communicating between the BSs 18 and the MSs/SSs 16. The Utility Operation Equipment 12 has a data connection (via a Router/hub 18) to the optional Base Station Controller (BSC) 20. The BSC 20 serves as the system's central data hub and controller.

The BSC 20 implements the functionality of an ASN Gateway as defined in the WiMAX standard. The main functionality of the BSC is to manage a location register from the Mobile Station which is used to route the traffic (via router 19) received from the Utility Operation Equipment to the appropriate Base Station depending on the location of the Mobile Station. The BSC also supports roaming of Mobile Stations from one BS to the other.

The Base Station Controller (BSC) 20 may be located at the Network Operation Center (NOC) 22. The Network Operation Center (NOC) 22 may comprise a Network Management System (NMS), DHCP server and AAA server.

Figure 2:
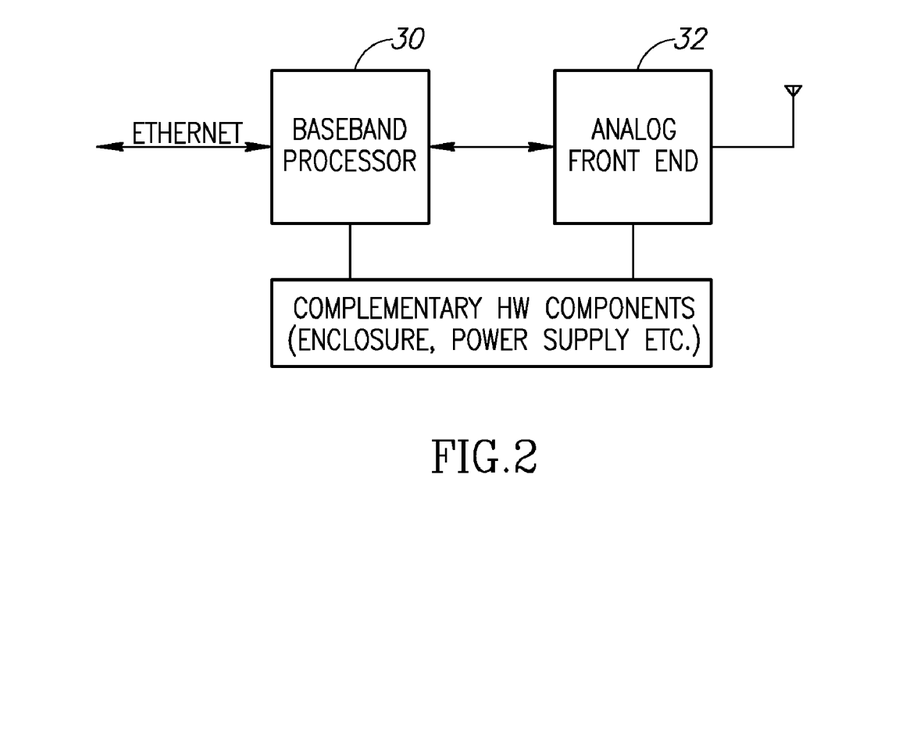
FIG. 2 is a schematic illustration of the platform architecture of the Base Station (BS) and Mobile Station (MS) used with the system of FIG. 1.

The BSC 20 is in communication with multiple Base Stations 18 located at PLMR tower sites (Only three BSs are shown in FIG. 2, for clarity but it will be appreciated that the system may have a much larger number of BSs). The Base Stations 18 are connected to the BSC 20 via backhaul connections. Each of these backhaul connections may be a bi-directional PtP wire line or wireless communication facility. The Base Stations 18 are typically installed indoors and are connected to outdoor antennas installed on the tower. Each BS 18 may have a serving area which typically extends up to 20 miles. Each MS/SS 16 may be connected to a Remote Terminal via an Ethernet or a serial interface, such as RS232, for example.

Reference is now made to FIG. 2, which is a schematic illustration of the platform architecture of the Base Station (BS) and Mobile Station (MS).

Both the BS and MS have a Software Definable Radio (SDR) architecture which comprises a baseband processor module and an analog front end module. The baseband processor module has programmable resources including a general purpose processor, a general purpose DSP and a general purpose FPGA. It may also include a GPSA module. The baseband processor module performs all transmit and receive signal processing functions (including the PHY layer and the MAC layer), and delivers modulated baseband digital I and Q signals to the analog front end.

The baseband processor module also performs digital filtering. The module has a bank of digital filters as needed to support the various channel sizes, the mobile WiMAX permutations and the applicable FCC regulation as per the operating frequency. For example, operation in the AMTS band is required to follow the FCC part 80 regulations in general and the FCC part 80.211 spectral mask in particular.

The mobile WiMAX permutations may include PUSC (Partially Use of Sub Carrier) in the downlink and uplink or alternatively FUSC (Full Use of Sub Carrier) in the downlink with optional PUSC in the uplink, for example. The PUSC and FUSC are defined in the mobile WiMAX standard. The downlink and uplink permutation used define the number of guard subcarriers and the applicable FCC spectral mask along with the permutation used and the digital filters determine the OFDMA (Orthogonal Frequency Division Multiplexing Access) symbol rate that is being used for the channel. The SDR architecture allows the system to support a wide range of waveforms and the downloading of new waveforms even after the system is deployed in the field. This flexibility is required to facilitate operation in a wide range of scenarios as described.

The analog front end may operate over a very wide frequency range (40 MHz to 1 GHz) and over a wide range of channel types as described hereinbelow. It may be designed for TDD (Time Division Duplexing) operation, that is, the TX and the RX sections are connected to the antenna through a Transmit/Receive switch. The analog front end may perform the following functions:

TX Direction
Reception of digital I and Q from the Baseband Processor Digital to Analog conversion;
Frequency up-conversion from baseband to the RF frequency selected by the user. This may be performed through a double conversion, first up conversion to the IF frequency at 1.22 GHz and then down conversion to the RF frequency;
Amplification to the TX power level using a configurable attenuator. The TX power level is configured manually by the operator at the BS and configured automatically at the MS using the mobile WiMAX ranging process;
Filtering is used to suppress out of channel and out of band interference;
A Digital Pre-Distortion (DPD) equalizer is used to attenuate inter-modulation products generated as a result of Power Amplifier non-linearity which help reduce transmit power backoff requirements; and
Feed the signal(s) to the antenna(s) through a T/R switch to support TDD operation. During the transmit phase of the TDD frame, the T/R switch is in the Transmit state and the transmit signal is returned to the receive path through a coupler. The transmit signal is returned over the receive path as a feedback signal for the DPD.

RX Direction
RF filtering to protect the LNAs;
Reception of the RF signal from the antenna through the T/R switch (when in the receive state);
Low Noise Amplification;
Double frequency conversion architecture:
Up conversion from RF frequency to IF frequency at 1.22 GHz;
IF filtering using a SAW filter bank (filter selection depends on channel bandwidth). The SAW filter is designed to protect the AGC;
Automatic Gain Control (AGC) amplification;
Down-conversion and demodulation into analog I and Q signals;
Analog filtering of analog I and Q by means of a programmable analog filter; and
Analog to digital conversion of I and Q and delivery to the baseband processor module.

The architecture of FIG. 2 consists of a baseband processor section 30 and an analog front end section 32. The interface between the two sections may be digital I/Q (that is, the A/Ds & D/As are located on the analog front end section 32). The BS 18 may be an indoor, single sector device housed in a 19", 1 U enclosure and connected to an outdoor Omni or sectorized antenna. A multiple (typically 3) sector Base Station may be formed by stacking multiple single sector base station units on top of each other and connecting each unit to an outdoor sectorized antenna. The MS is an outdoor device, which may be designed for deployment in a cabin of a truck.

The analog front end section 32 may be configured to operate over a frequency range between 40 MHz and 958 MHz. The frequency band of operation may transmit up to 50 watts effective power, for example.

The available bandwidth may support the following frequency reuse schemes:
Minimum frequency reuse factor of 3 (that is, the available bandwidth will be split into a minimum of 3 channels which are not necessarily adjacent to each other).
Minimum frequency reuse factor of 1 (that is, the entire available bandwidth will be reused in each sector and in each base station in the system).
In the case of reuse factor of 1, each sector may operate over distinct sub-channels or over all sub-channels (as defined in the mobile WiMAX standard). When each sector operates over distinct sub-channels, the analog front end module at each sector base station and mobile stations in the sector, delivers the entire channel (that is, all sub-channels) to the baseband processor module. Interference between the sectors is avoided due to the orthogonality of the subcarriers with no need for analog/digital filtering.
In the case of reuse factor 1, when all sub-channels are used in each sector, each sector base station may use a Fractional Frequency Reuse (FFR) scheme as follows:
The DL (Downlink) MAP and the UL (Uplink) MAP will have two PUSC zones. The DL-MAP and UL_MAP are terms defined in the mobile WIMAX standard
The first PUSC zone in the DL MAP and in the UL MAP will be allocated all sub-channels. The second PUSC zone in the DL MAP and in the UL MAP will be allocated distinct sub-channels (not allocated in the second zone in the other sectors).
Each mobile station will be allocated transmit opportunities in the first or in the second zone, depending on its instantaneous Carrier to Interference and Noise Ratio (CINR).

The individual channel may consist of one or more frequency segments which may or may not be adjacent to each other. The minimum bandwidth of a segment is 25 KHz. Thus, for example, a 200 KHz wide channel may be formed from a single 200 KHz segment, from two non adjacent 100 KHz wide segments, from four non adjacent 50 KHz wide channels or from eight non adjacent 25 KHz segments.

The band of operation may be dedicated to the broadband data service or it may be shared with another service, such as PLMR voice, for example, by the same operator in which case a sharing mechanism will be needed. For the purposes of example only, the description relates to the use of a dedicated bandwidth to the broadband data service.

The analog front end may consist of:
A RF Small Signal Board (RFSS) which performs baseband and IF processing including A/D & D/A conversion, filtering and up/down conversion.
A RF Front End Board (RFFE) which includes the PA and LNA circuitry.

The baseband processor 30 section is designed to perform signal processing and control functions as needed to execute the mobile WiMAX PHY layer at the BS and MS, the mobile WiMAX MAC layer at the BS and MS and complementary embedded software functions. The architecture of the BS and MS is referred to as Software Definable Radio because of the ability of the baseband processor, due to its configurable resources, to implement many other non WiMAX waveforms.

The baseband processor 30 may consist of a single board. It has one Ethernet 100 Base T interface, one digital I/Q interface (to connect to the Analog front end section) and one RS232 interface to support serial communication requirements. The RS232 port may be used as an interface to legacy Supervision Control and Data Acquisition (SCADA) devices. A non-standard Service Specific Convergence Sub-layer is designed to encapsulate the legacy SCADA protocol over the mobile WiMAX air interface protocol.

Figure 3:
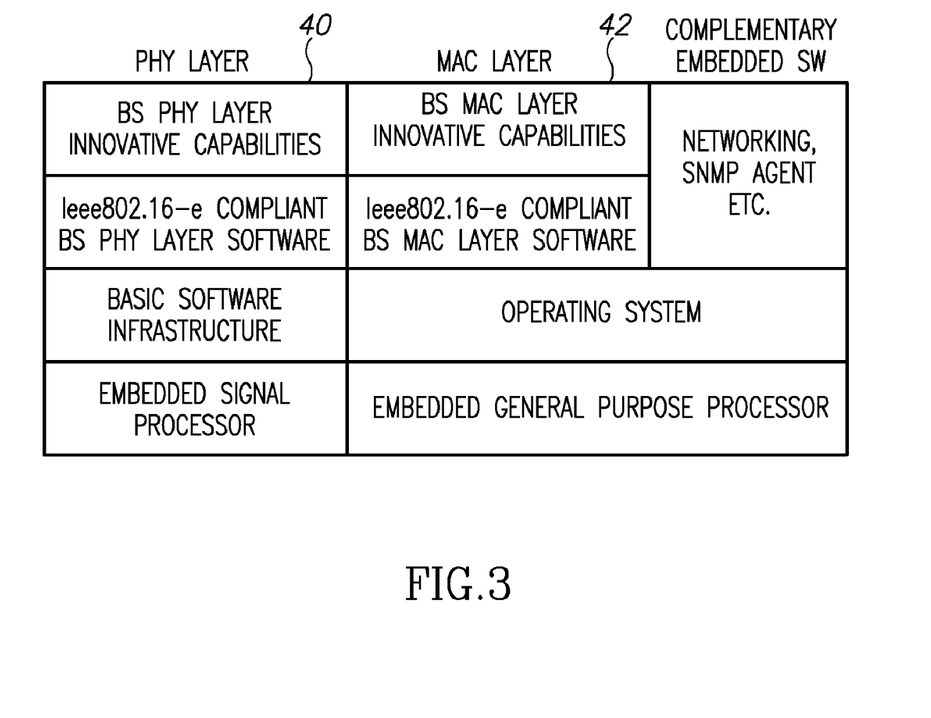
FIG. 3 is a schematic illustration of the software architecture of the Base Station (BS) and Mobile Station (MS)

Reference is now made to FIG. 3 which is a schematic illustration of the software architecture of the Base Station 18 (BS) and Mobile Station 16 (MS). This architecture is designed to leverage as much as possible from off-the-shelf mobile WiMAX to implement the BS and MS PHY 40 (physical layers) and MAC 42 (Media Access Controller) layers. As shown in FIG. 3, the software innovation described in this application occurs is in the upper layer of the software architecture.

In an embodiment of the invention, the system may employ a modified version of the mobile WiMAX standard for the air interface protocol. The system may employ the standard mobile WiMAX air interface protocol when the channel is supported by the standard (e.g., 1.25 MHz, 1.75 MHz, 3.5 MHz, 5 MHz and 10 MHz wide channels) and a modified version of the air interface protocol when the channel size is not supported by the standard as described hereinbelow.

In one preferred embodiment of the invention, the PHY Layer of the BS and MS/SS may support non standard channel sizes of BW (BW<1.25 MHz) by scaling down the sub-carrier frequency spacing in a linear proportion to the standard mobile WiMAX 128 FFT configuration designed for a 1.25 MHz wide channel. The sub carrier spacing may be reduced to $\Delta f=(BW/1.25 \text{ MHz})*10.94 \text{ KHz}$ (instead of the standard 10.94 KHz sub-carrier spacing at 1.25 MHz). The Useful Symbol time may be increased to $Tb=1/\Delta f=1/((BW/1.25 \text{ MHz})*10.94 \text{ KHz})$, the Cyclic Prefix may be increased to $Tg=Tb/8$ and the Total OFDMA Symbol Time will be increased to $Ts=Tg+Tb$. The TDD frame duration is extended to avoid excessive overhead. A minimum of 47 OFDMA symbols per TDD frame will be used but this number will be increased to reduce MAC overhead. As an example, one possible TDD frame duration is 141 symbols (3×47 symbols) resulting in a frame duration of approximately 12 msec for 47 symbols and 36 msec for 141 symbols at 500 KHz channel size.

In another example, a 200 KHz wide channel will require a sub-carrier spacing of $\Delta f=(200 \text{ KHz}/1.25 \text{ MHz})*10.94 \text{ KHz}=1.75 \text{ KHz}$. The Useful Symbol time will be increased to $Tb=(1.25 \text{ MHz/BW})*91.4 \text{ μs}=571.4 \text{ μs}$ (instead of the standard 91.4 μs for 1.25 MHz), the Cyclic Prefix will be $Tg=Tb/8=571.4/8=71.425 \text{ μs}$ and the Total OFDMA Symbol Time will be $Ts=Tg+Tb=571.4+71.425=642.825 \text{ μsec}$. The TDD frame duration for 48 OFDMA symbols will be 642.825×48=30.855 msec. Any of the standard sub-channel permutation schemes (PUSC, FUSC or AMC) as defined in mobile WiMAX for 128 FFT will be used.

In another embodiment of the invention, the BS and MS/SS PHY Layer may support non standard channel sizes of BW (BW<1.25 MHz) by scaling down the number of sub-carriers while maintaining the standard sub-carrier frequency spacing of 10.94 KHz. The number of sub-carriers N will equal N=floor (BW/10.94 KHz).

In yet another embodiment of the invention, a mobile WiMAX standard channel or a non standard channel as outlined above is divided into a number of standard or non standard sub channels—(The mobile WiMAX standard defines the number of sub-channels relative to the total number of sub carriers in the channel).

The sub-carriers of each sub-channel are limited to a single frequency segment as defined hereinabove. Sub-channels falling in between available frequency segments will not be used for transmission. Out of band/out of channel interference in the transmit direction and selectivity (that is, avoiding interference from signals received over frequencies between available frequency segments) in the receive direction is maintained by the analog front end as outlined below. It should be noted that orthogonality is maintained between the active sub channels.

Figure 4A:
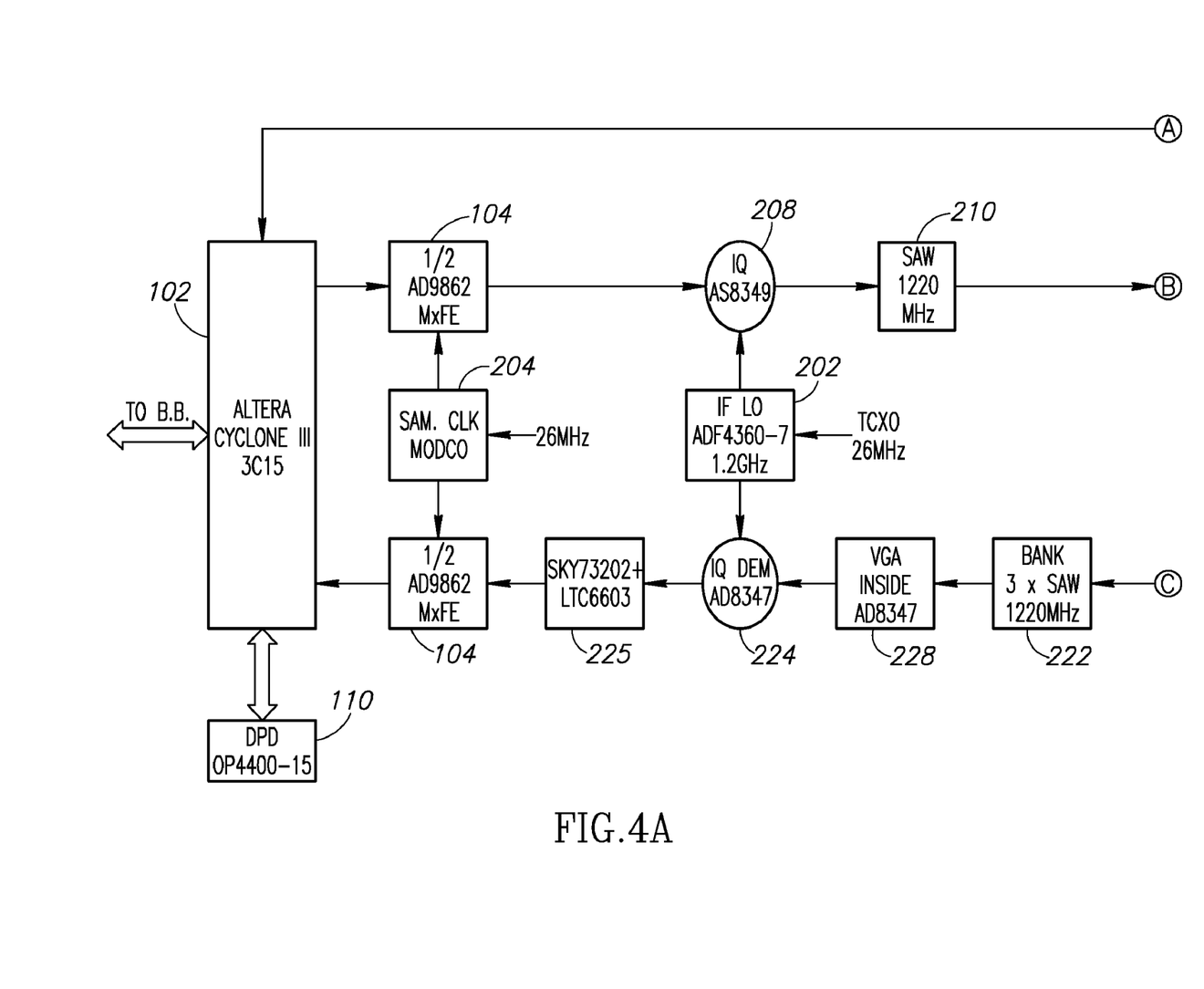
FIG. 4 is a schematic illustration of the Analog Front End of the Base Station (BS) and Mobile Station (MS)
Figure 4B:
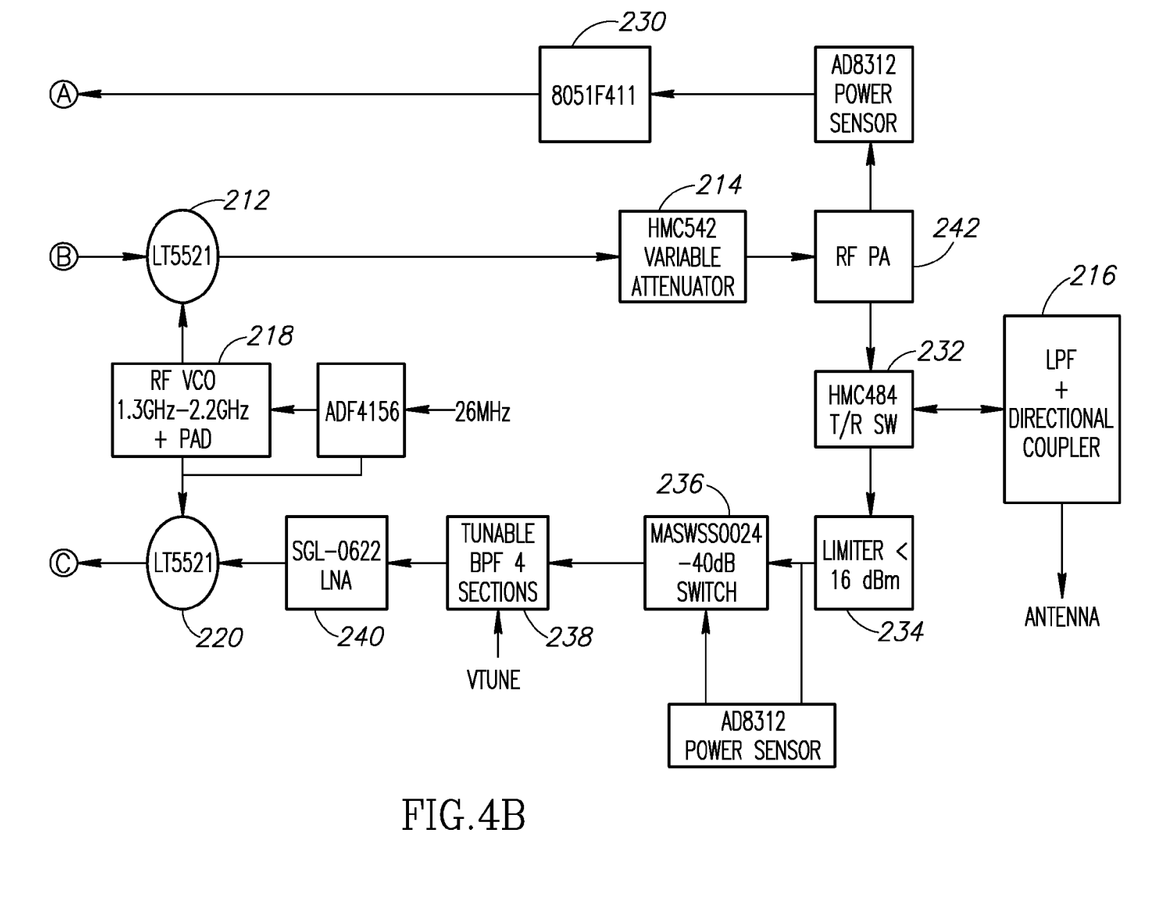

Reference is now made to FIG. 4 which is a schematic illustration of the Analog Front End of the Base Station (BS) and Mobile Station (MS).

This block diagram consists of the following sections:
A Mixed Signal Front End (MxFE)—described with reference to FIG. 5 below.
A Digital Pre Distortion Equalizer (DPD) circuitry—described with reference to FIG. 6 below.
Analog front end IF section—described with reference to FIGS. 7 and 8 below.
Analog front end RF section—described with reference to FIG. 9 below.

Figure 5:
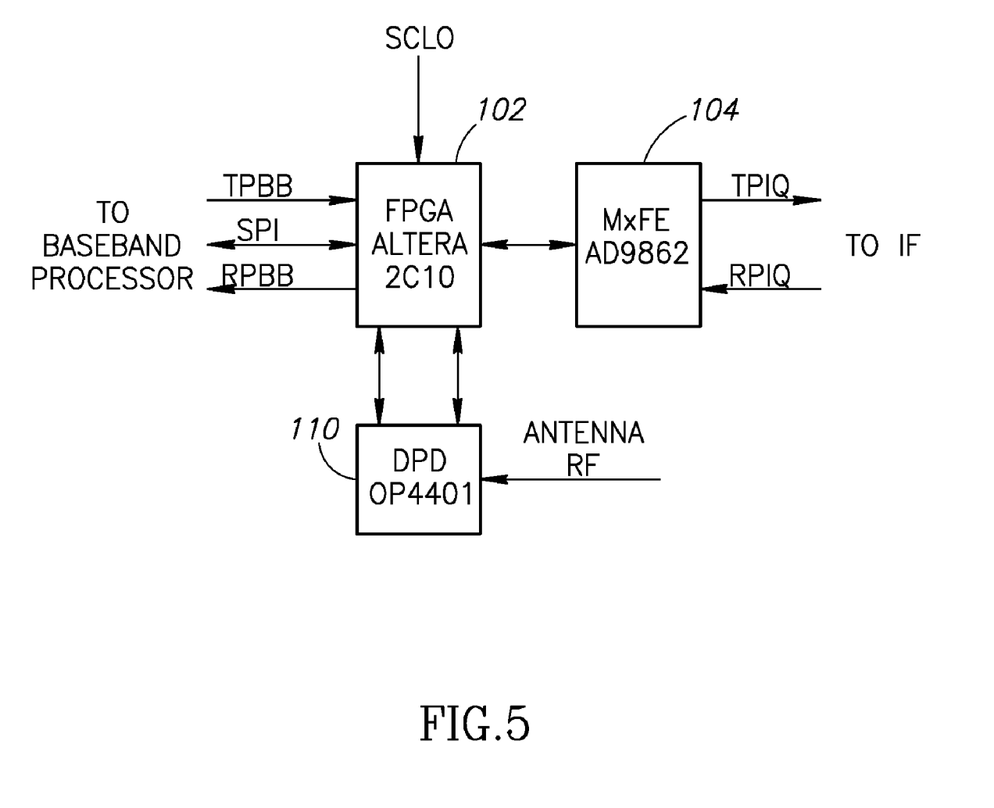
FIG. 5 is a schematic illustration of the Mixed Signal Front End (MxFE) circuitry used with the of Analog Front End of FIG. 4.

The Mixed Signal Front End (MxFE) of FIG. 5 comprises an FPGA (field-programmable gate array) 102, such as the FPGA board manufactured by Altera, for example, a dual A/D & D/A device such as AD9862 12-/14-Bit Mixed Signal Front-End Processor 104, manufactured by Analog Devices, for example and a Digital Pre Distortion Equalizer 110, such as the OP4400 manufactured by Optichron, for example. The FPGA 102 is in communication with the DPD 110 and MxFE 104, as shown.

The FPGA 102 has the following functions:
Controls data interface between the baseband processor and the analog Front End
SPI (Serial Peripheral Interface) data bus (SPI)
Command and Control Interface
Transmit Path
  Baseband data interface—This is the I/Q data from the baseband processor module
  Routes I/Q data to the DPD processor 110
Receive Path
  Baseband data interface—This is the I/Q data after filtering in the AD device (104).
  Receive while transmit to support DPD processor 110.

The Digital Pre Distortion Equalizer (DPD), described with reference to FIG. 6, significantly reduces out of channel and out of band emission to meet FCC requirements and adjacent channel interference requirements.

The OP4401 is an example of a self-contained digital pre-distortion (DPD) integrated circuit with no external processor or peripheral circuitry needed to significantly enhance the performance of wireless transmitters.

The dual D/A & A/D device 204 has the following functions:
Timing Generation Circuitry Allow for Single Clock Operation (for both receive and transmit)
Transmit Signal Path Includes:
  Two 14-Bit, up to 128 MSPS D/A Converters with programmable Full-Scale Output Current
  Channel independent digital Fine Gain and Offset Control.
Receive Signal Path Includes:
  Input Buffers & Programmable Gain Amplifiers
  Low-Pass Decimation Filters with programmable bandwidth
  Two 12-Bit, up to 64 MSPS Sampling A/D Converters with Internal or External Independent References,
  Auxiliary DAC 122 and ADC 134 used for RSSI (received signal strength indication), temperature sensing, for example.

Figure 6:
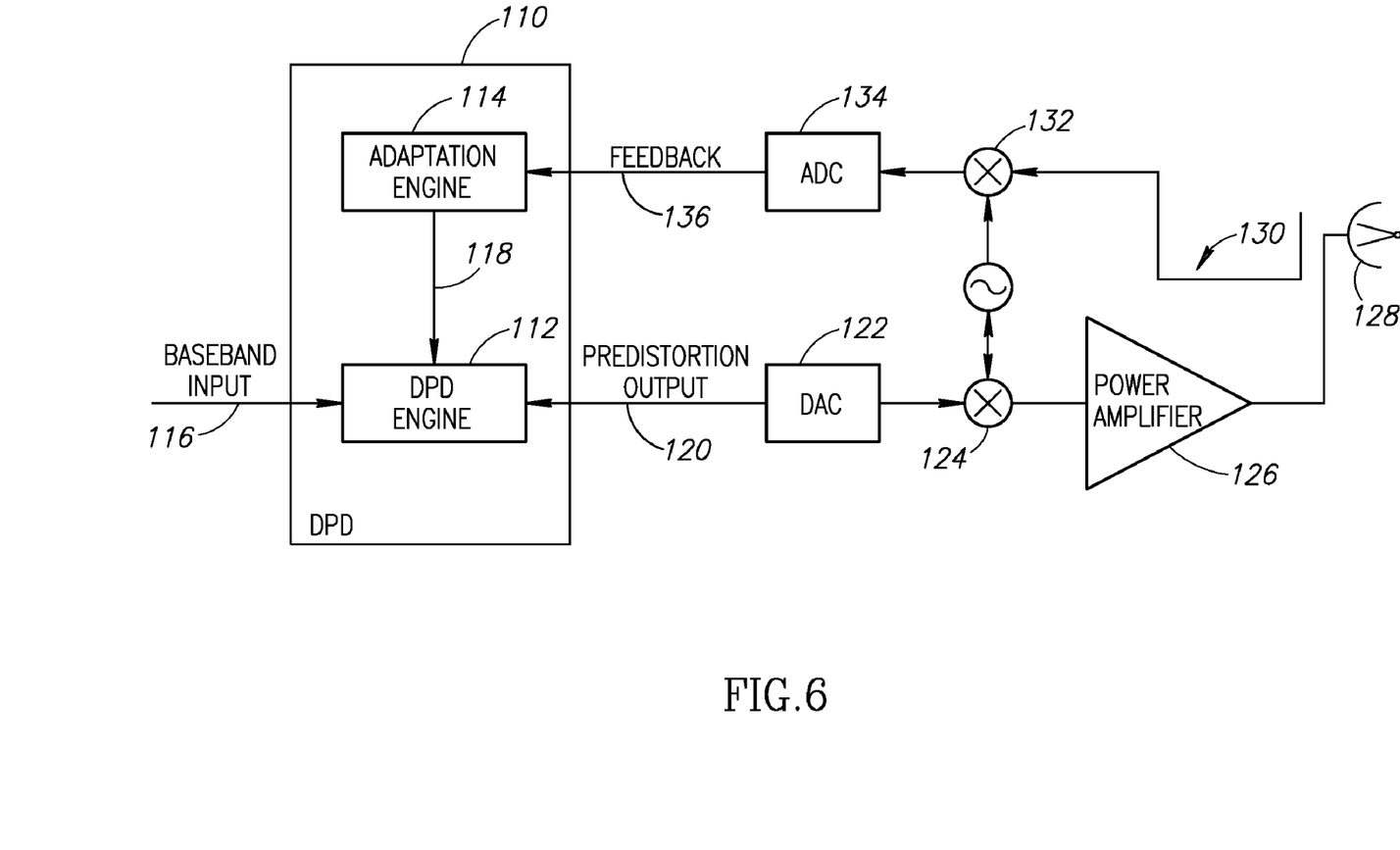
FIG. 6, which is a schematic block diagram illustration of the pre-distortion equalizer (DPD) used with the of Analog Front End of FIG. 4.

Reference is now made to FIG. 6, which is a schematic block diagram illustration of the pre-distortion equalizer (DPD) 110.

The pre-distortion equalizer (DPD) 110 comprises a DPD Engine 112 in communication with an adaptation engine 114. The DPD Engine 112, which is at the center of the architecture, compares the clean baseband signal 116 with the distorted feedback signal received from antenna 118 and generates a pre-distorted output signal 120 which is fed to the transmit chain. The transmit chain comprises a Digital to Analog Converter (DAC) 122, frequency up converter mixer 124, Power Amplifier 126 and an antenna 128. The signal transmitted at the antenna 128 is returned to the RX path 130 via down converter mixer 132 and Analog to Digital Converter (ADC) 134. The feedback signal 136 is fed into the adaptation engine 114, which removes components of the feedback signal, such as interference signals from other radios, for example, that need to be excluded from comparison by the DPD engine. It should be noted that the DPD circuit takes advantage of the Time Division Duplex mode of operation of the system. Since the system does not transmit and receive at the same time, the feedback receive path may be used during the transmission phase.

Figure 7:
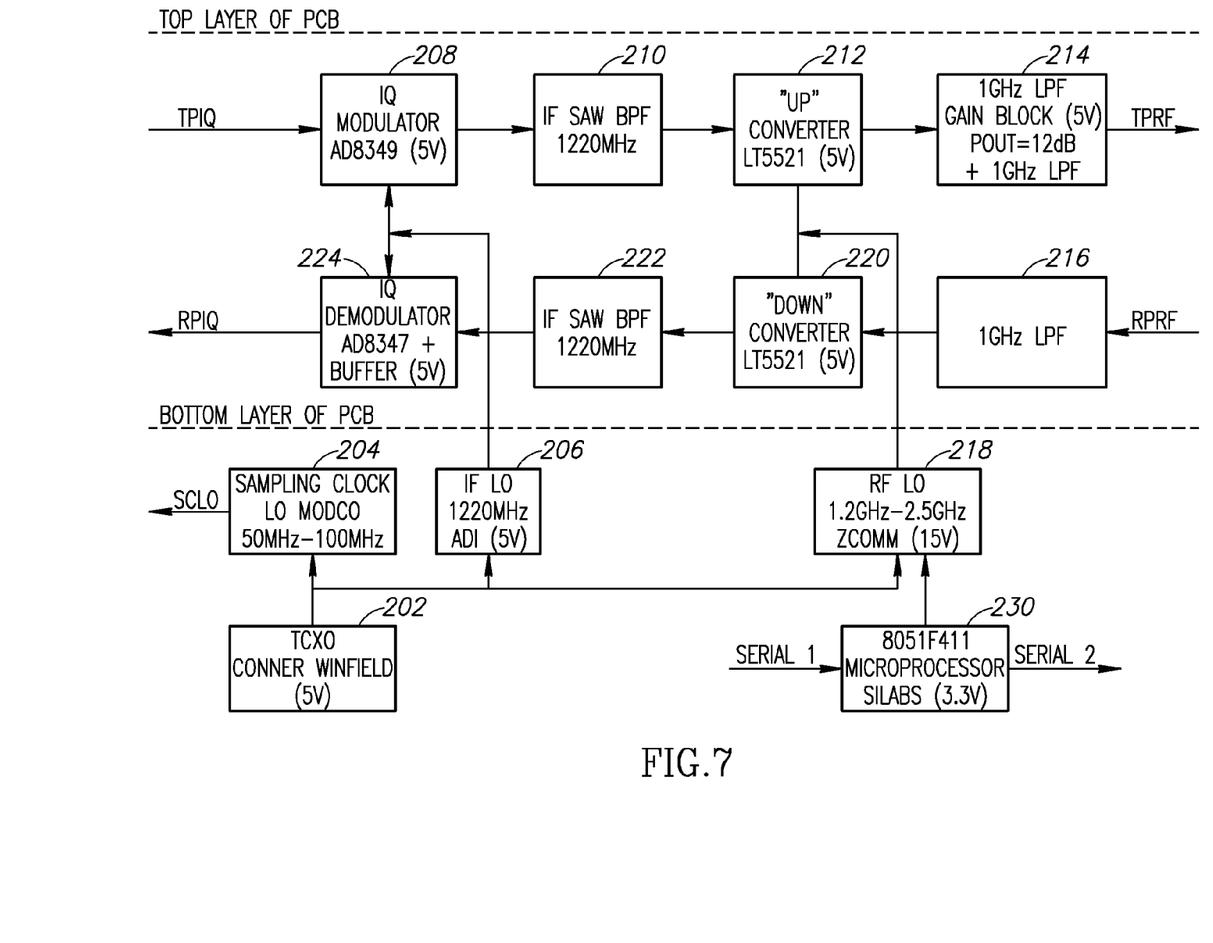
FIG. 7 is a schematic block diagram illustration of the Analog Front End IF section, used with the Analog Front End of FIG. 4.

Reference is now made to FIG. 7, which is a schematic block diagram illustration of an exemplary Analog Front End IF section, which may be used with the BS and MS of the system. The Analog Front End IF section comprises an IF TCXO (Temperature Compensated Crystal Oscillator) 202. The TCXO provides a stable reference frequency to the entire RF section and has a center frequency of 26 MHz. The temperature stability is 1 ppm (compared with 802.16e standard of 30 ppm) to allow accurate tuning of narrow band signals.

Alternatively, a 0.1 ppm TCXO may be used. Reduction in channel size while maintaining the number of sub carriers reduces the spacing between sub carriers. In this case, a more accurate oscillator than in the standard ieee802.16e channels is required.

IF Transmit Path

A Synthesizer LO 204 generates the various ieee802.16e prescribed sampling rates required by picoCHip (each bandwidth option has a different sampling rate). The IF LO 206 is fixed at 1.22 GHz, but may be fine tuned at power up, if required.

The AD IQ modulator 208 (such as the AD8349) shifts the transmit I/Q signals from baseband to an IF frequency of 1220 MHz. The SAW BPF (SAW Band Pass Filters) 210 removes modulation harmonics. The RF LO tunes from 1.3 GHz to 2.3 GHz The "UP" converter 212 (such as the LT5521, manufactured by Linear Technology) shifts the modulated IF signal as follows:

Low side: 1.3 GHz–1.220 GHz=80 MHz
High side: 2.3 GHz–1.220 GHz=1080 MHz.
The gain block 214 amplifies the TX signal so output is up to 12 dB to accommodate various RF PA blocks IF Receive Path A 1 GHz LPF (low Pass Filter) 216 limits incoming signals to required tuning range. The RF LO 218 tunes from 1.3 GHz to 2.3 GHz The "Down" converter 220 (such as the LT5521, manufactured by Linear Technology) shifts the incoming RF signal to 1.22 GHz as follows:

Low side: 1440 MHz–132 MHz=1220 MHz
High side: 2178 MHz–958 MHz=1220 MHz
The IF LO 206 is fixed at 1.22 GHz (can be fine tuned at power up). The SAW switched BPF 222 bank removes modulation harmonics (the selection of BPF is determined by the channel bandwidth).

The AD IQ demodulator 224 (such as the AD8347) provides gain, analog RSSI & 69 dB of AGC. It shifts received IF signal to baseband I & Q.

The LTC6603 (215) performs low pass programmable filtering.

Figure 8:
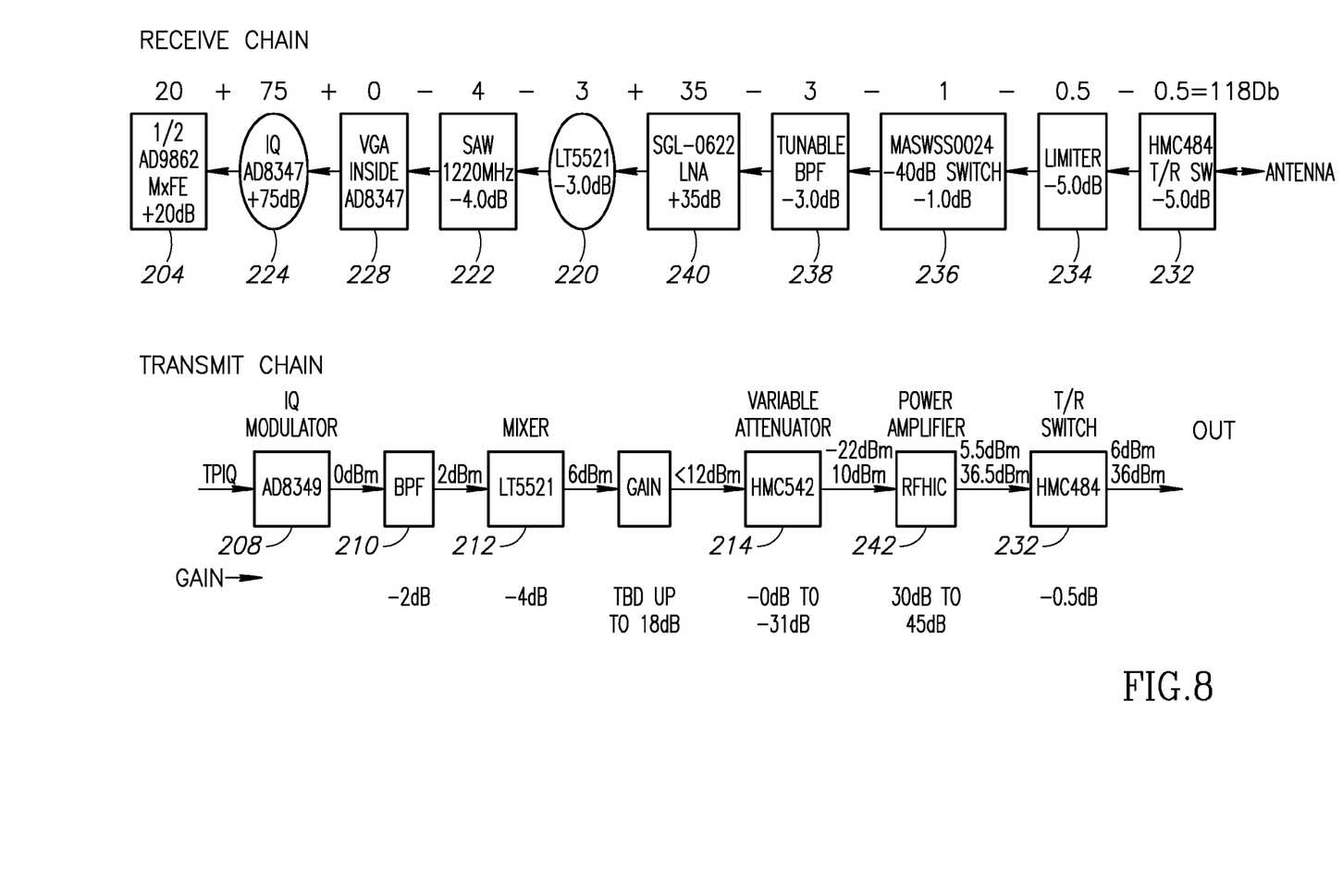
FIG. 8 is a schematic block diagram illustration of the IF Section gain and signal levels for the Analog Front End IF configuration of FIG. 7.

FIG. 8 describes the IF Section gain and signal levels for the configuration of the Analog Front End IF section of FIG. 7.

Figure 9:
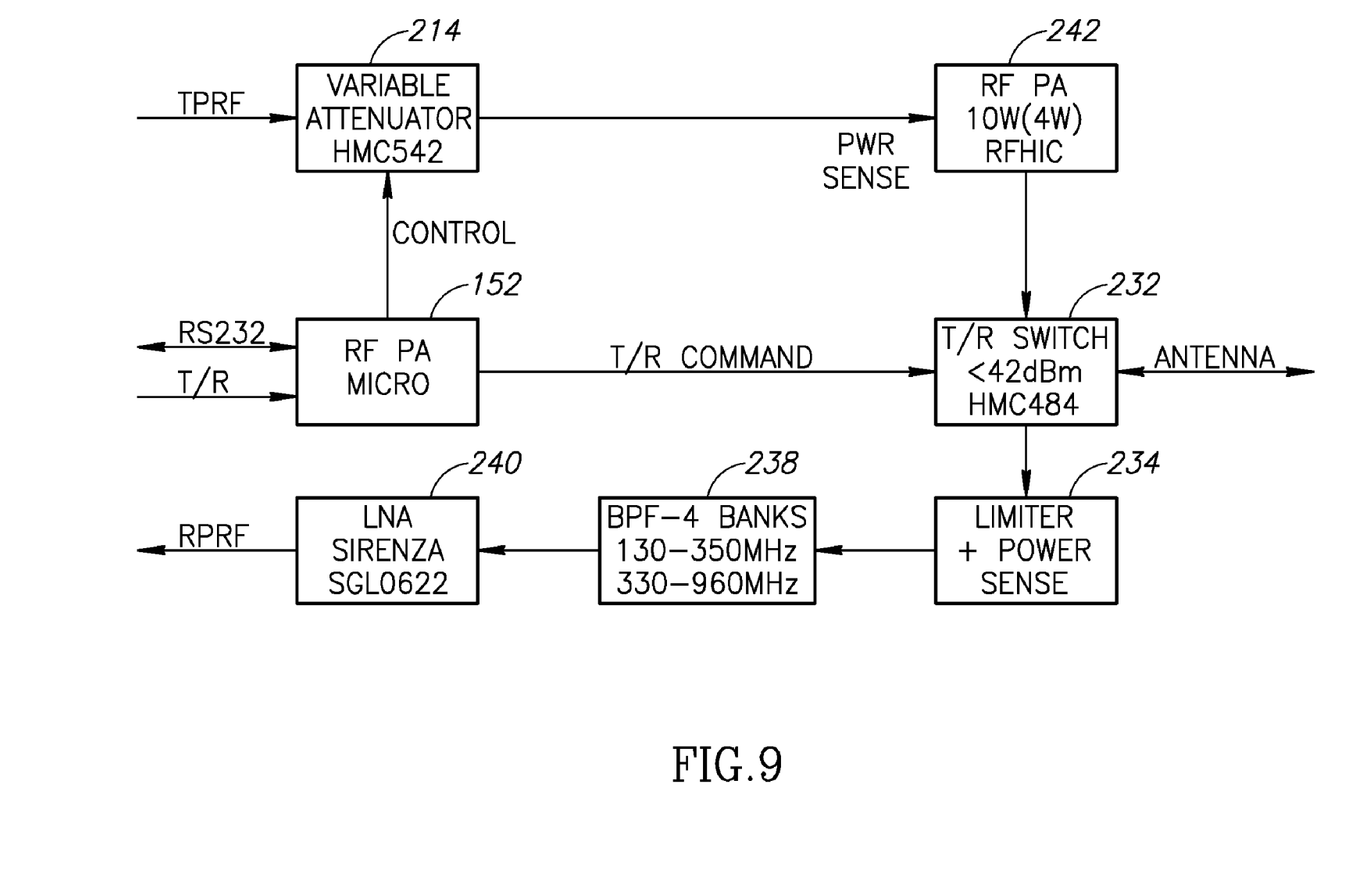
FIG. 9 is a schematic block diagram illustration of the Analog Front End RF section, used with the Analog Front End of FIG. 4.

Reference is now made to FIG. 9, which is a schematic block diagram illustration of the Analog Front End RF PA (power amplifier) section.

The RF PA section is based upon a Modular Design. The Base Station has several power options (after back off) including a 42 dBm version to overcome losses on long cables to antenna and 36 dBm version. The Mobile Station power has a 36 dBm version. The RFPA is also configured to support future additions, such as FPGA logic to program latency in transmit path and hooks to adjust PA supply voltage, for example.

The RF comprises a RF PA microprocessor controller 152 in communication with a variable attenuator 214, RF PA 242 and a T/R switch 232.

The microprocessor controller 152 controls the variable (digital) attenuator 214 and monitors power levels of the transmit and receive paths (to regulate over temperature and protect against mismatch). The microprocessor controller 152 controls the Transmit/Receive switch 232; controls (on/off) power to PA and selects the BPF banks 238 and tunes the BPF.

The variable (Digital) Attenuator 214, which is capable of adding 0 to 31.5 dB of attenuation to the transmit path, is controlled via SPI data bus.

The Tunable Band Pass Filters (BPF) supports multiple banks:

130 MHz-350 MHz
330 MHz-960 MHz.

The BPF may have a spare (DNP) two banks. The BPF 158 tunes via analog signal generated from microprocessor during transmit mode to obtain minimum insertion loss.

A LNA 240 (Low Noise Amplifier) such as the SGL0622 manufactured by Sirenza, for example, is connected to the BPF 238. The LNA 240 determines the noise figure of the system.

Automatic protection circuits are fitted to both the Receiver and Transmit sections.

In the Receiver section, the input RF signal from the antenna is a hard limited to <=16 dBm (Limiter 234). The AGC is hard switched to 40 dB to prevent saturation of the LNA at high signal levels.

In the Transmitter section, the current draw of the PA is monitored and automatically shutdown if the current reaches a pre-determined level. The protection circuits monitors the output power to antenna and shutdowns under severe antenna mismatch conditions.

Figure 10A:
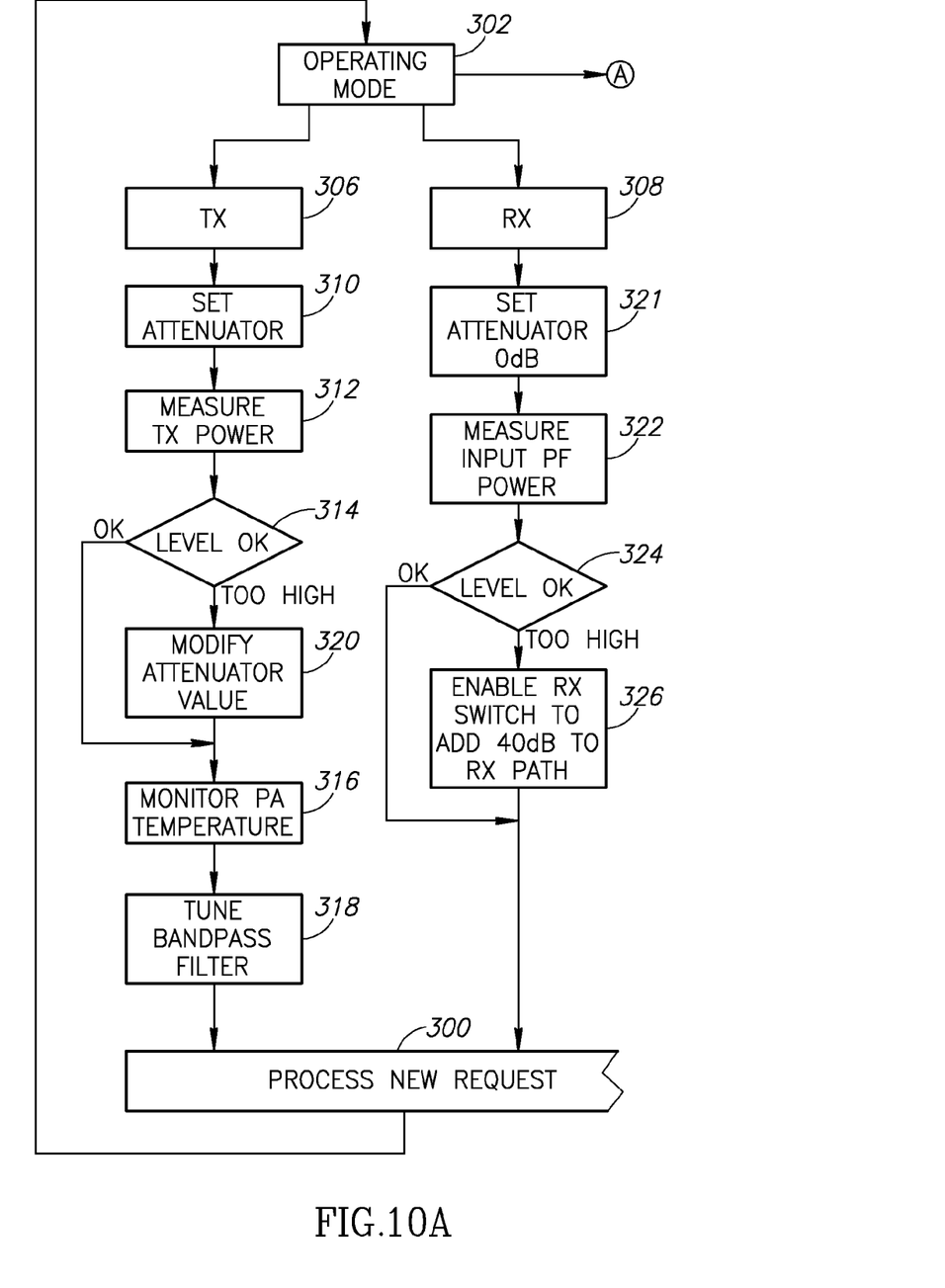
FIG. 10 is a flow chart illustration of the RF Section software running in the RF controller of FIG. 9.
Figure 10B:
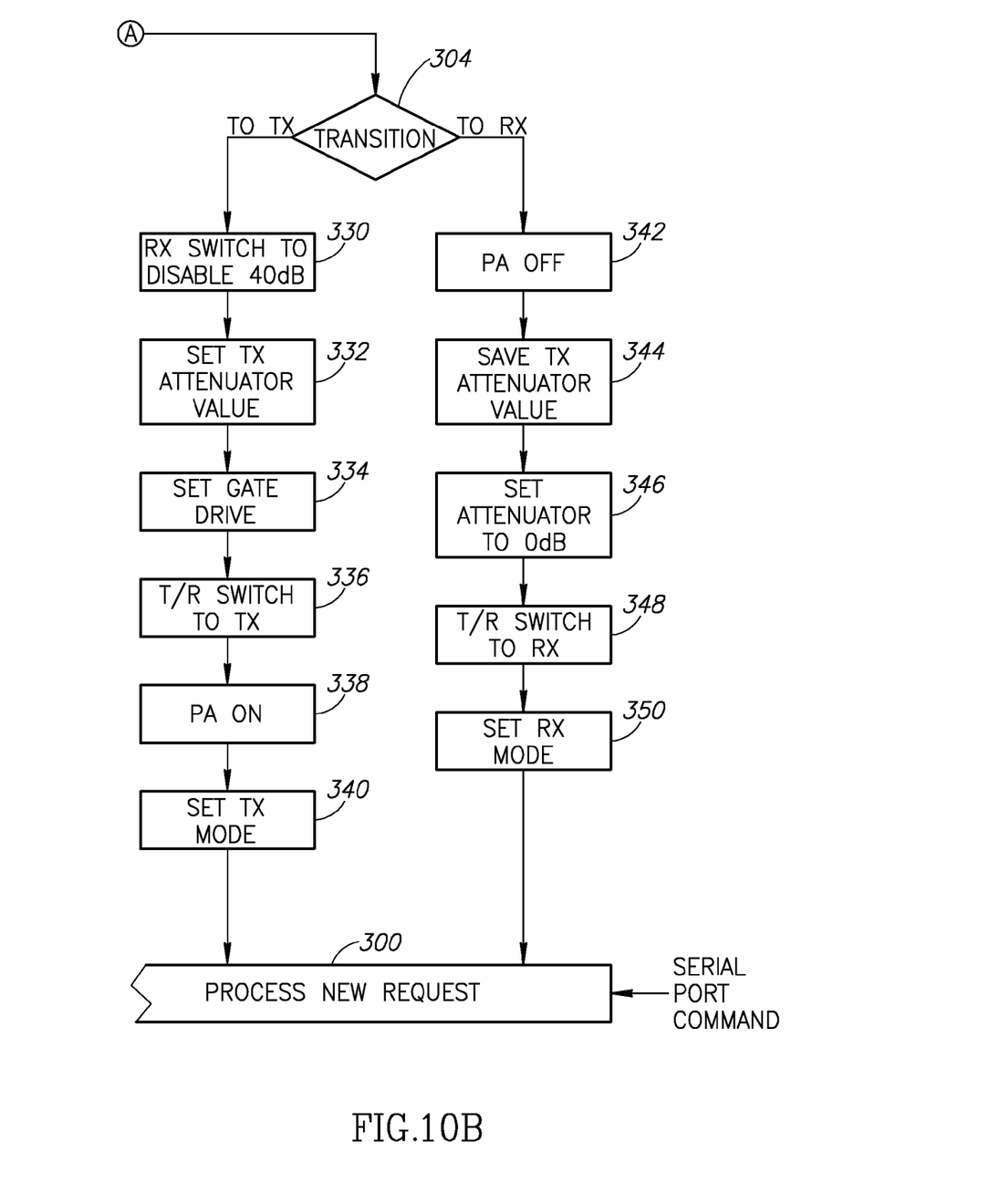

FIG. 10 is a flow chart illustration of the RF Section software running in the RF controller 152, described in FIG. 9.

On receipt of a request (step 300), the controller selects the operating mode (step 302), which may be either to change the mode (query box 304) between TX and RX or commence operations in the already selected mode. If the latter, the operating mode is set to either RX (step 306) or RX (step 308).

If the operating mode is TX (306), the attenuator value is set (step 310) and the TX power is measured (step 312). If the power level is OK (query box 314), the PA temperature is monitored (step 316) and the bandpass filter is tuned (step 318).

If the power level is too high (query box 314), the value of the attenuator 154 is modified to the correct value (step 320) before steps 316 and 318 are performed. The processor is then ready for a new request (step 300).

If the operating mode is RX (308), the attenuator 154 is set to 0 dB (step 321) and the input RX power is measured (step 322). If the power level is OK (query box 324), the processor moves on to a new request (step 300).

If the power level is too high (query box 324), the RX switch is enabled to add 40 dB to the RX path (step 326).

If a request is made to change the mode (step 304) to TX, the RX switch is set to disable 40 dB (step 330) and the attenuator value is set (step 332). The gate drive is set (step 334) and the T/R switch is set to TX (step 336). Then the PA is switched on (step 338) and the TX mode is set (step 340).

If a request is made to change the mode (step 304) to RX, the PA is turned off (step 342). The attenuator value is saved (step 344) and set to 0 dB (step 346). The T/R switch is set to RX (step 348) and the RX mode is then set (step 350).

It will be appreciated that the present invention is not limited by what has been described hereinabove and that numerous modifications, all of which fall within the scope of the present invention, exist.

Rather the scope of the invention is defined by the claims, which follow:

What is claimed is:

1. A point to multipoint wireless system comprising:
   a router hub;
   a plurality of base stations, each of said base stations covering at least one sector; and
   a plurality of mobile stations and fixed subscriber stations,
   wherein each of said plurality of base stations maintains two-way data communication with said plurality of mobile stations and fixed subscriber stations in its serving area, over licensed frequency bands below 1 GHz in accordance with the mobile WiMAX air interface standard (ieee802.16e),
   wherein the mobile WiMAX air interface standard (ieee802.16e) is modified for channel sizes below 1.25 MHz, and
   wherein the PHY (physical) Layer of each of said plurality of base stations and each of said plurality of mobile and subscriber stations is configured to support channel sizes having a bandwidth less than 1.25 MHz by scaling down the sub-carrier frequency spacing in a linear proportion to the standard mobile WiMAX 128 FFT configuration designed for a 1.25 MHz wide channel.

2. The system according to claim 1, further comprising a base station controller in communication with said router hub.

3. The system according to claim 1, wherein said frequency bands have a range of frequencies from 40 MHz to 1 GHz.

4. The system according to claim 1, wherein said two-way data communication utilizes Time Division Duplexing (TDD) operation.

5. The system according to claim 1, wherein each of said plurality of base stations and each of said plurality of mobile stations comprises:
   a baseband processor module in communication with an analog front end module, said baseband processor module comprising:
   a general purpose processor;
   a general purpose DSP (Digital signal processor);
   a general purpose FPGA (field-programmable gate array); and
   a GPS module.

6. The system according to claim 5, wherein said baseband processor module has a bank of digital filters implemented in the FPGA, each filter of said bank of digital filters configured to support a specific channel size and specific downlink and uplink permutations and specific FCC spectral mask, in accordance with the mobile WiMAX standard.

7. The system according to claim 5, wherein the analog front end is configured, during transmission, to perform the steps of:
   reception of digital I and Q from the Baseband Processor Digital to Analog conversion;
   frequency up-conversion from baseband to a pre-determined IF frequency and then down-conversion to the RF frequency;
   amplification to the TX power level using a configurable attenuator, wherein the TX power level is configured manually by the operator at the base station and configured automatically at the mobile station using the mobile WiMAX ranging process;
   filtering to suppress out of channel and out of band interference;
   Digital Pre-Distortion (DPD) equalization to attenuate inter-modulation products generated as a result of Power Amplifier non-linearity thereby to reduce transmit power backoff requirements; and
   feeding at least one signal to at least one antenna) through a T/R switch to support TDD operation, wherein during the transmit phase of the TDD frame, the T/R switch is in the Transmit state and the transmit signal is returned to the receive path through a coupler,
   and wherein the transmit signal is returned over the receive path as a feedback signal for the DPD.

8. The system according to claim 7, wherein the analog front end is configured, while receiving, to perform the steps of:
   RF filtering to protect the LNAs;
   Reception of the RF signal from the antenna through the T/R switch, when in the receive state;
   Low Noise Amplification;
   frequency up-conversion from the RF frequency to a pre-determined IF frequency, IF filtering using a SAW filter bank, Automatic Gain Control (AGC) amplification and down-conversion and demodulation into analog I and Q signals;
   analog filtering of analog I and Q by means of a programmable analog filter; and
   analog to digital conversion of I and Q and delivery to the baseband processor module.

9. The system according to claim 1, wherein the available bandwidth is reused in each sector in a tower site.

10. The system according to claim 9, wherein each sector in a tower site operates over distinct sub-channels, wherein any two sectors in the tower site do not employ the same sub-channels.

11. The system according to claim 10, wherein the analog front end module at each of said base stations and each of said plurality of mobile stations is configured to deliver all sub-channels within the channel to the baseband processor module, wherein the baseband processor module only processes the sub-channels that are utilized in the respective sector.

12. The system according to claim 11, wherein each of said plurality of base stations utilizes a Fractional Frequency Reuse (FFR) scheme, said FFR comprising:
   a DL (Downlink) MAP message having two PUSC (Partially Use of Sub Carrier) zones and an UL (Uplink) MAP message having two PUSC zones;

wherein the first PUSC zone in the DL MAP message and in the UL MAP message are allocated all the sub-channels; the second PUSC zone in the DL MAP and in the UL MAP are allocated distinct sub-channels, which have not been allocated in the second zone in other sectors at the same tower site; and wherein each mobile station is allocated transmit opportunities in the first or second zone, depending on its instantaneous Carrier to Interference and Noise Ratio (CINR).

13. The system according to claim 5, wherein said baseband processor module further comprises a RS232 interface configured to interface to legacy Supervision Control and Data Acquisition (SCADA) devices, wherein a non-standard Service Specific Convergence Sub-layer is configured to encapsulate the legacy SCADA protocol over the mobile WiMAX air interface protocol.

14. The system according to claim 1, wherein the sub-carrier frequency spacing ($\Delta f$) is reduced in accordance with the formula: $\Delta f=(BW/1.25\ MHz)*10.94\ KHz$, The Useful Symbol time (Tb) will be increased in accordance with the formula: $Tb=1/\Delta f=1/((BW/1.25\ MHz)*10.94\ KHz)$, the Cyclic Prefix (Tg) will be increased in accordance with the formula: $Tg=Tb/8$ and the Total OFDMA Symbol Time (Ts) will be increased to $Ts=Tg+Tb$.

15. The system according to claim 1, wherein the number of sub-carriers is reduced in accordance with the formula: $N=floor\ (BW/10.94\ KHz)$.

16. The system according to claim 4, wherein the each TDD frame comprises at least 47 OFDMA symbols.

* * * * *